United States Patent [19]

Chien

[11] Patent Number: 5,719,672
[45] Date of Patent: Feb. 17, 1998

[54] ECHELLE SPECTROMETER WITH A SHAPED ORIENTED SLIT

[75] Inventor: Ring-Ling Chien, San Jose, Calif.

[73] Assignee: Varian Associates, Inc., Palo Alto, Calif.

[21] Appl. No.: 721,148

[22] Filed: Sep. 26, 1996

[51] Int. Cl.$^6$ ................................. G01J 3/04; G01J 3/18
[52] U.S. Cl. ........................................................ 356/328
[58] Field of Search ................................. 356/305, 326, 356/328

[56] References Cited

U.S. PATENT DOCUMENTS 5,088,823  2/1992  Smith, Jr. et al. .................. 356/328
5,473,427  12/1995  Riley et al. ........................ 356/328

Primary Examiner—F. L. Evans

[57] ABSTRACT

An improved echelle spectrometer comprises a slit in light blocking plate, an echelle grating, and a detector array. The slit is shaped and oriented to align an image of a light beam projected through the slit, onto the echelle grating and onto the detector in a desired orientation and shape relative to the detector array. Precise adjustment of the shape and orientation of the slit is dependent on the orientation of the detector with respect to the dispersion direction of the echelle grating. The echelle spectrometer provides high detector resolution with reduced read-out time.

17 Claims, 5 Drawing Sheets

ECHELLE SPECTROMETER WITH A SHAPED ORIENTED SLIT

FIELD OF THE INVENTION

Background of the Invention

The invention relates in general to the field of atomic spectroscopy and, more particularly, to an improved echelle spectrometer. Specifically, the invention describes an echelle spectrometer which has been modified to provide high detector resolution by using a shaped, orientated entrance slit which corrects the optical distortion caused by the grating geometry so that the image of the entrance slit will match the orientation and shape of the resolution element of the detector.

In atomic spectroscopy, which includes atomic absorption, atomic emission, and atomic fluorescence, electromagnetic radiation of a wavelength characteristic of a particular element is quantitatively determined and used as a measure of the concentration of that particular element in a sample. The intensity of the radiation at the characteristic wavelength is proportional to the concentration of the element in the sample.

The sensitivity of any of these atomic spectroscopic techniques depends in part on the ability to select radiation of a particular wavelength range, resolve the selected wavelength range into a pattern of spectral lines, and detect the intensity of the radiation associated with the spectral lines. Wavelength selection and resolution is typically carried out by a spectrometer. Radiation of a range of wavelength is passed through an entrance slit located at the focus of a collimating mirror (first mirror). The collimated ray is then reflected onto a grating and dispersed into a pattern of spectral lines (i.e., a dispersion pattern), with each wavelength being dispersed at a characteristic angle (i.e., a dispersion angle) from the grating.

In spectrometers using conventional high ruling density gratings, measurement of radiation is typically conducted for the lower diffraction orders, most preferably the first order. This is done because of the potential overlap of wavelengths of different orders emitted at the same angle from the grating and because a much higher percentage of radiation can be obtained using the first order in these conventional gratings. However, both the dispersion (i.e., angular dispersion) and resolving power of the grating are improved when higher orders are used.

To take advantage of the greater resolution and angular dispersion obtainable at higher orders, echelle gratings with blazed lines are employed. Echelle gratings are characterized by a smaller size with fewer ruled lines, typically, 95 to 100 lines/mm compared with more than 1000 lines in a conventional grating. The lines are cut into the surface of the grating at an angle or blaze to the surface. The blaze changes the diffraction properties of the grating so that for any wavelength range it is possible to channel a higher proportion of radiation into the higher orders at the desired diffractive angle. The various diffraction orders generally lie on top of one another. A cross dispersion element (e.g., a prism) can be used to further separate the overlapping orders into the orthogonal direction.

Once the grating, either echelle or conventional, resolves the radiation into different diffracted angles, a camera mirror (second mirror) is then used to create a dispersion pattern on the focal plane of the mirror. This pattern consists of images of the entrance slit for each wavelength being dispersed.

The orientation and shape of the image of the entrance slit depends on the geometry of the spectrometer. There are two possible orientations of the incident radiation relative to the echelle grating rulings or grating normal. In the first orientation, the grating rulings are orthogonal to the meridional plane of the incident ray. In this configuration, the slit and its image lie in the horizontal loci of the mirrors and the grating has no effect on the vertical aberration of the system. The resulting image of the entrance slit then has the same shape as the entrance slit itself and is oriented parallel to the grating rulings.

In the second orientation, the grating rulings are parallel to the meridional plane and the incident and the diffracted rays form a small angle θ with the plane through the grating normal. The slit and its image lie in the vertical foci of the mirrors and the grating will then cause vertical aberration. The resulting image will then tilt at an angle $$X = \arctan(2\tan\alpha \tan\theta)$$

with respect to the orientation of the grating rulings and entrance slit, where α is the grating blazed angle. This assumes that the grating is used in the Littrow position where the angle of the incident and diffracted rays with the grating normal is the same as the grating blazed angle. This second type of orientation, although having a tilted image, is generally preferred in an echelle spectrometer due to higher grating efficiency and better optical quality.

Various type of detectors have been used to detect spectral images at the focal plane of the spectrometer. Linear and area arrays of photodiodes, charge-coupled devices (CCD), charge injection devices (CID), and plasma coupled devices have been used to retrieve optical signals from conventional grating spectrometers as well as echelle grating spectrometers.

A CCD which could be used in an echelle spectrometer would contain an x-y grid of pixels that might be comprised of 1,000 rows and 1,000 columns of pixels, for a total of 1,000,000 pixels. Detectors of this type have the advantage of being able to detect all signals within the spectrometer, including background noise. The x-y grid of detector pixels is aligned with the grating rulings. If the pixels have different sizes in the x and y dimension, the grid with the wider dimension is usually aligned parallel to the grating rulings. To achieve the highest resolution, the image of the entrance slit should closely match the orientation and shape of the detector pixels. A general rule of practice is that the width of the slit is used as the resolution element and is matched to twice the width of a CCD pixel.

This requirement of matching the slit image to the orientation and shape of the detector pixels presents no problem for the first type of grating spectrometer where the grating rulings are orthogonal to the meridional plane of the incident ray. However, the tilted images of the second type of grating spectrometer are a problem when using a x-y grid type of CCD detector. The tilted image and consequent mismatch with the shape of the detector pixels results in a loss of spectral information. The lost information means lower resolution and a diminished performance for the spectrometer. The use of an x-y grid type of CCD detector also results in a mismatch of shape between the detector and the diffraction pattern. Tradeoffs exist between underfilling or overfilling of the detector. In addition, because every pixel is read in an x-y grid type of CCD detector, read-out time is long, even though many of the pixels may have no useful information.

It may be possible with a tilted slit image to improve the spectral line shape reproduction by using a computer algorithm to recover and reconstruct the spectrum. However, since the signal in the direction of the slit height may fall upon more than two pixels, this would require the use of an x-y grid type of CCD detector having additional pixels to recover the entire signal. Moreover, in such a case, a multiple readout must be performed for any single spectral line which will reduce the Signal/Noise ratio and hence diminish the performance of the spectrometer.

Another type of solid-state detector has arrays of sensing elements positioned exactly along and on the locations of diffraction pattern on a focal plane of an echelle grating spectrometer. This type of detector provides continuous spectral coverage with much faster read-out time. To achieve high resolution in this type of detector, the image of the entrance slit should match closely to the orientation and shape of the pixels in the detector arrays.

Therefore, an object of the present invention is to provide a specially shaped entrance slit such that the resulting image on the focal plane of the spectrometer will match the orientation and shape of the detector pixels to achieve high resolution.

Another object of the invention is to increase the spectral coverage of an echelle system by orienting the detector at an angle with respect to the dispersion pattern. The spectral resolution is then maximized by precise adjustment of the tilt of the entrance slit.

SUMMARY OF THE INVENTION

The echelle spectrometer of the present invention comprises a slit, an echelle grating and a detector. The slit is shaped by translating a short side of a normally rectangular slit in a direction parallel to the other short side of the rectangle, thereby stretching the two long sides of the rectangle.

Radiation projected through the slit and on to the grating is diffracted. The diffracted radiation forms a dispersion pattern (i.e., spectral lines) which is projected at the detector.

The echelle spectrometer described allows for the generation of a dispersion pattern of a known shape that contacts the detector in a precise and predefined location. The manner by which the shape of the spectral lines falls upon the detector is controlled by adjusting the shape and orientation of the slit. Precise adjustment of the slit is dependent on the orientation of the detector with respect to the dispersion direction of the echelle grating.

DESCRIPTION OF ONE ILLUSTRATIVE EMBODIMENT

Figure 1:
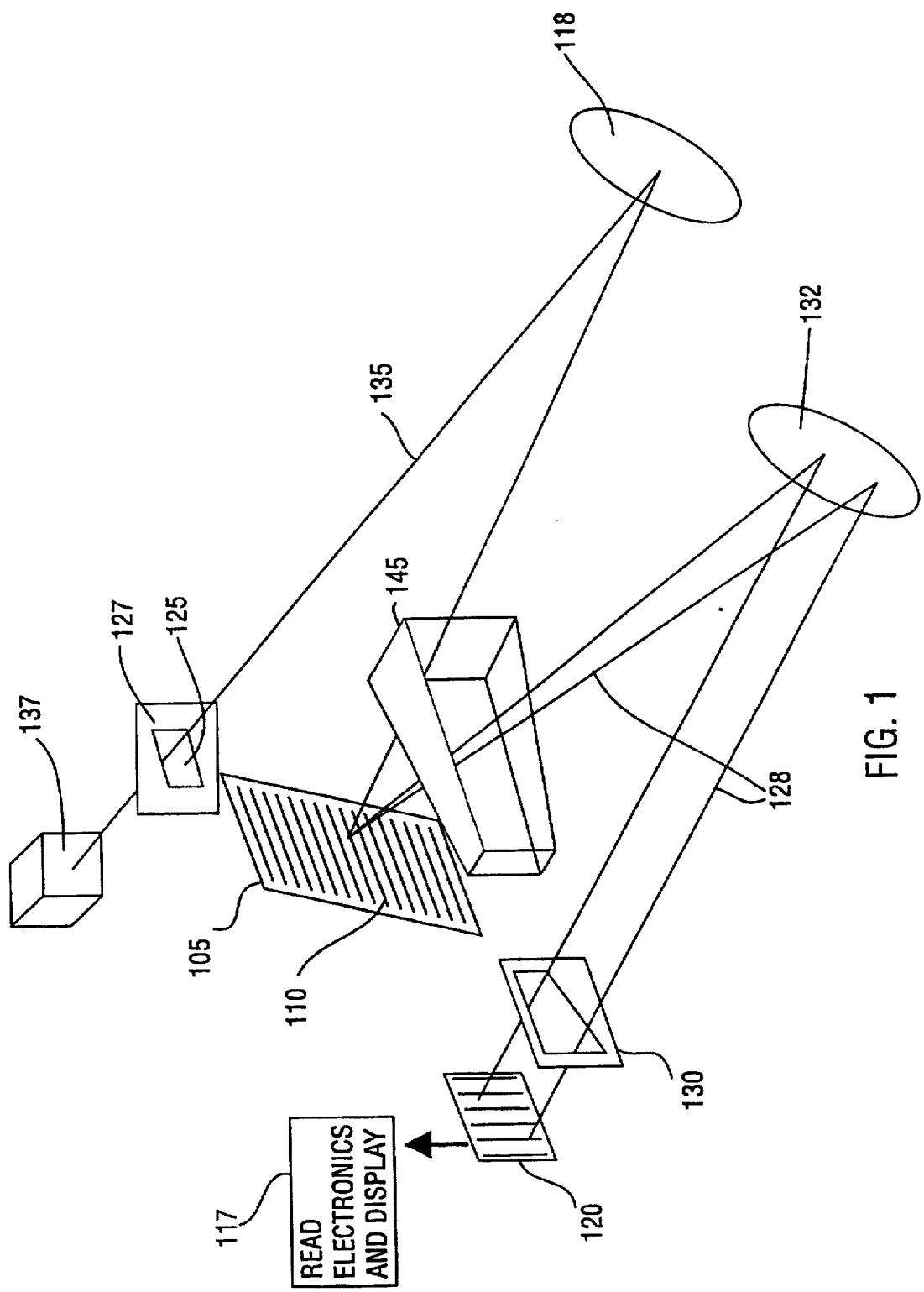
FIG. 1 is an illustration of the main components of an echelle spectrometer in accordance with the present invention.

FIG. 1 illustrates the main components of an echelle spectrometer in which the slit of the present invention may be used. The spectrometer generally includes an echelle grating 105 that has a plurality of ruling lines, a cross dispersion element 145, for example, a prism, and a detector array 120. Additional optical elements, such as mirrors 118 and 132, are used to reflect and focus the incoming radiation, the diffracted radiation, and ultimately the dispersed radiation.

The electromagnetic radiation to be analyzed, typically emanating from a source 137, should uniformly illuminate the entrance slit. As is well known in the art, the term "slit" means an opening 125 in a plate or other light blocking structure 127 that allows radiation to enter into the spectrometer. The radiation is then collimated by the first mirror 118 and incident on the echelle grating 105. Radiation of a range of wavelengths incident at the grating at the same incident angle are diffracted at angles which varied with wavelength. The diffracted beam 128 includes relatively high orders overlapping together. A prism 145 may be used to disperse the various orders, and a two-dimensional diffraction pattern is formed. Reflector 132 may be used to form the image of the entrance slit in a predetermined focal plane in the spectrometer. A mask is placed between the echelle grating 105 and the detector 120, such as shown by mask 130. A detector 120 is positioned to intercept the spectrum at the image plane. Signals developed at detector 120 are processed in read-out electronics 117.

Figure 4:
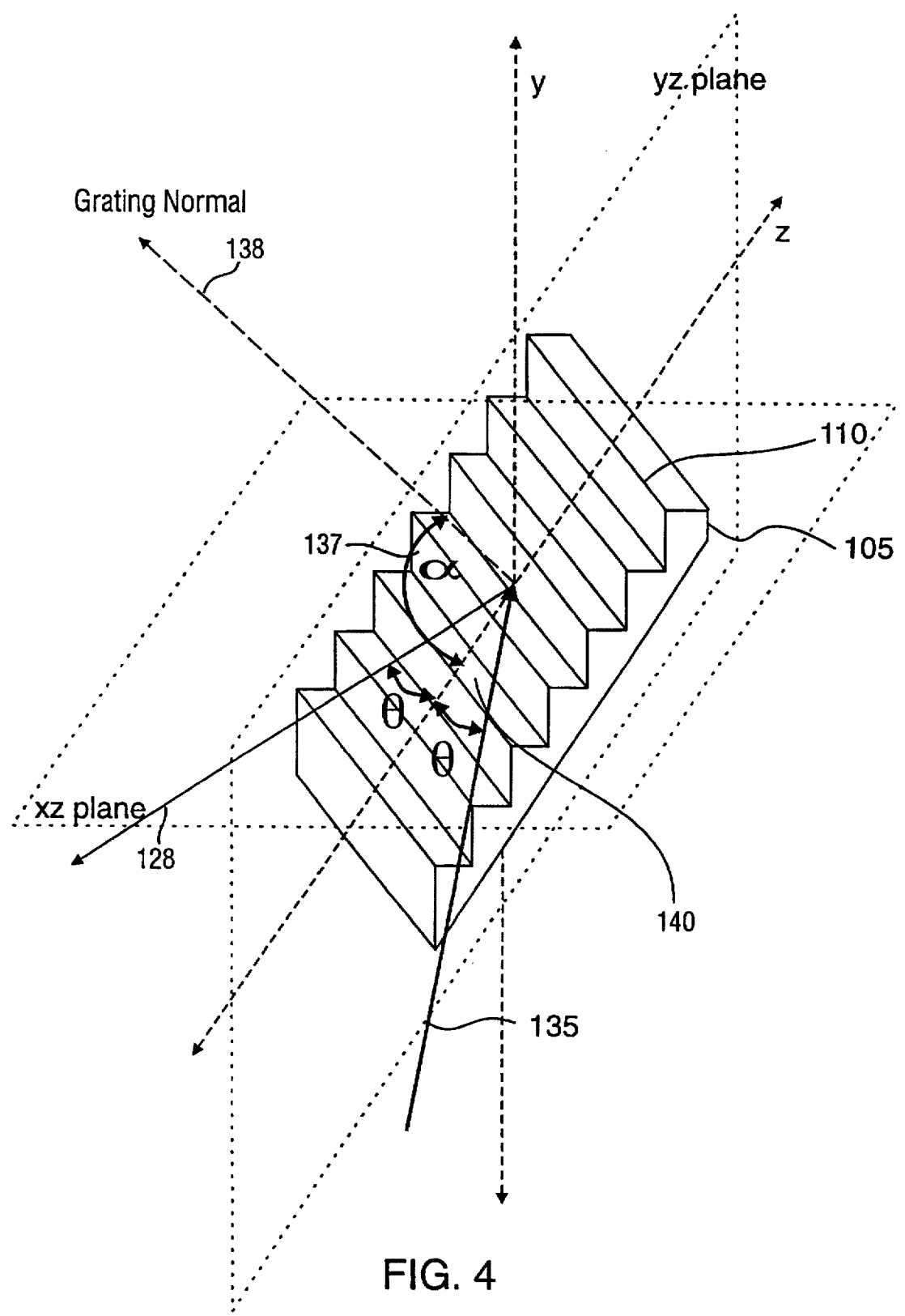
FIG. 4 is an illustration of an echelle grating as described in the invention.

The echelle grating 105 is preferred to be used in quasi-Littrow mode as shown in FIG. 4 where the incident ray 135, and the diffracted ray 128, measured in the x-z plane, form an angle α 137 with respect to the grating normal 138. This angle has the same magnitude as the blaze angle of the grating, for example 45 degrees. The grating 105 is mounted with the ruling grooves 110 parallel to the meridional (horizontal) plane. The grating may have approximately 95 grooves per millimeter. The incident 135 and the diffracted 128 rays make an angle θ 140 with respect to the plane through the grating normal.

Figure 5A:
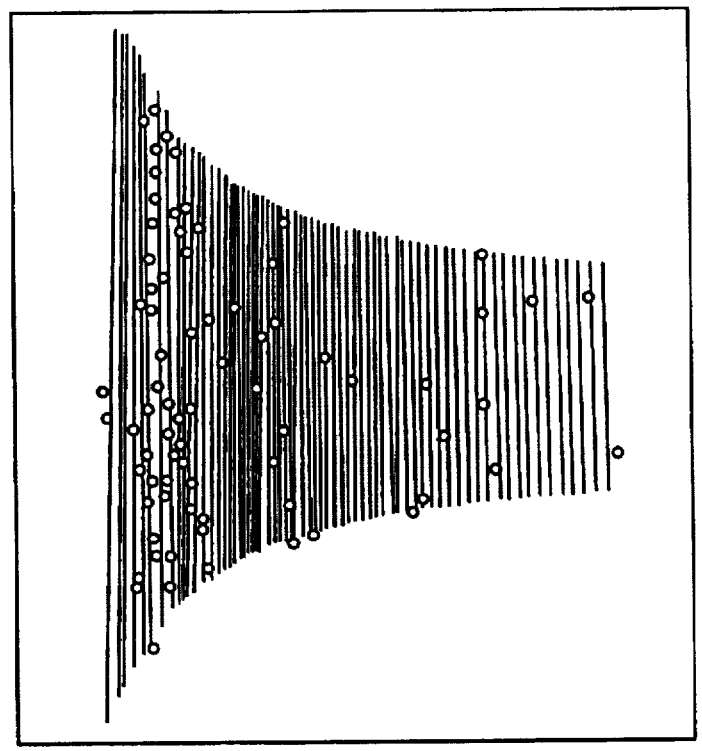
FIG. 5(a) is an illustration of a two-dimensional diffraction pattern created in an echelle spectrometer and oriented horizontally.
Figure 5B:
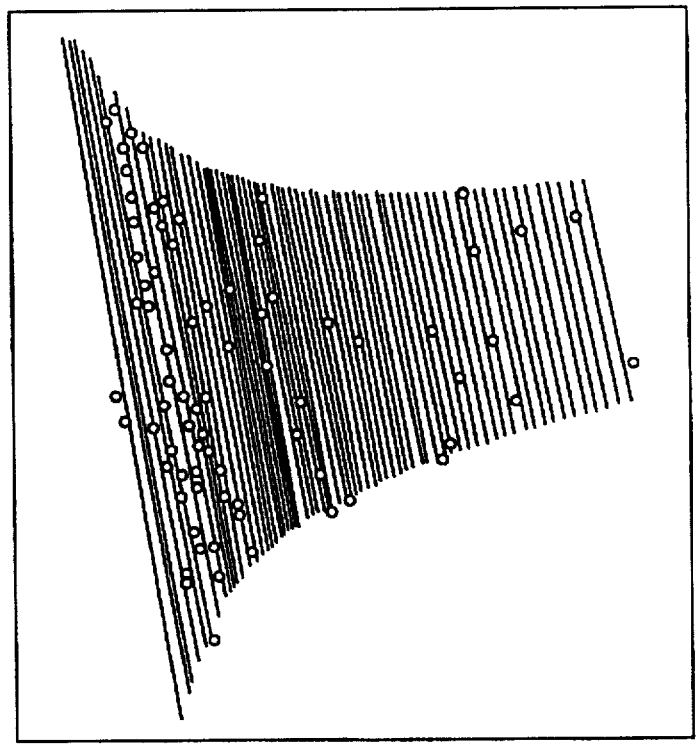
FIG. 5(b) is an illustration of a two-dimensional diffraction in pattern of an echelle spectrometer, oriented at a skew angle.

FIG. 5(a) illustrates a two-dimensional diffraction pattern created in the image plane of the echelle spectrometer. In a preferred detector design, the sensing elements are arranged to form a plurality of skewed linear arrays such that the angle of each array tracks the angle and curvature of the particular diffraction order to be detected by that array. FIG. 5(b) illustrates a two-dimensional diffraction pattern oriented at a skew angle.

Figure 6C:
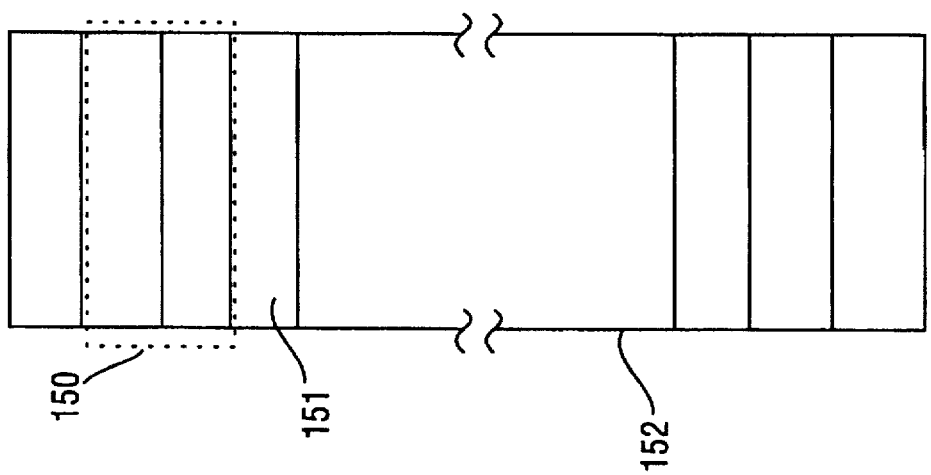
FIG. 6(c) is an illustration of the image of a shape oriented slit on a detector array, the image aligning squarely with the skewed linear array.
Figure 6B:
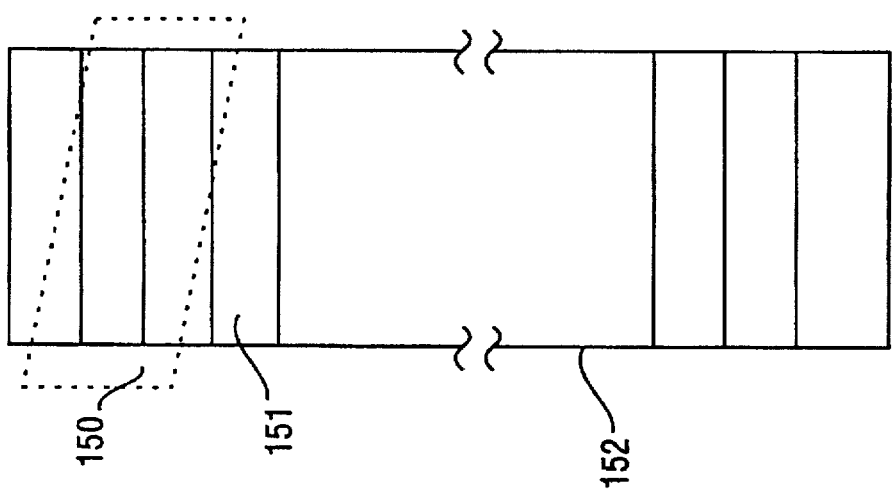
FIG. 6(b) is an illustration of the image of a conventional straight-edged rectangular slit on a detector array, the image tilted by an angle with respect to the direction of the skewed linear array.
Figure 6A:
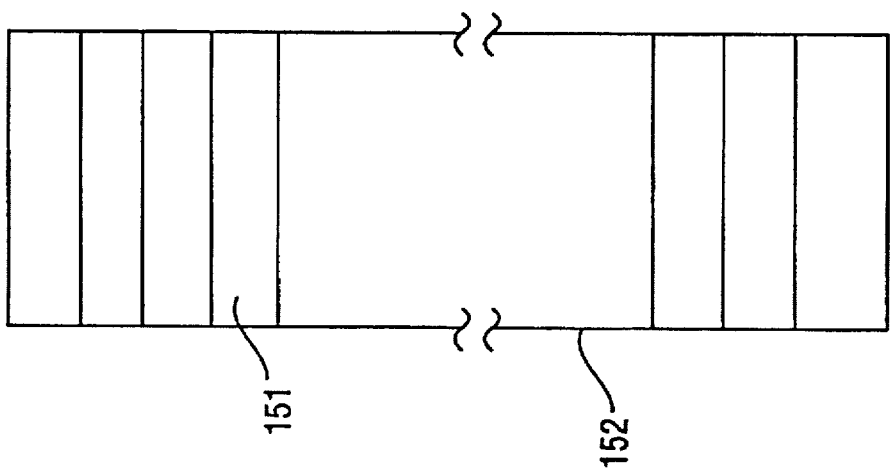
FIG. 6(a) is an illustration of a plurality of pixels in a linear detector array.

Depending on the particular spectrometer design, each individual array 152 may include a plurality of optical sensing elements 151 of varying sizes, called pixels, as shown in FIG. 6(a). The resolution element is generally chosen to match to twice the width of the pixel along the dispersion direction. Because the lengths of the pixel arrays may vary due to the change of free spectra range, the number of pixels in the orders will be different. A typical size of the pixels is 25 micron by 50 micron.

Figure 2:
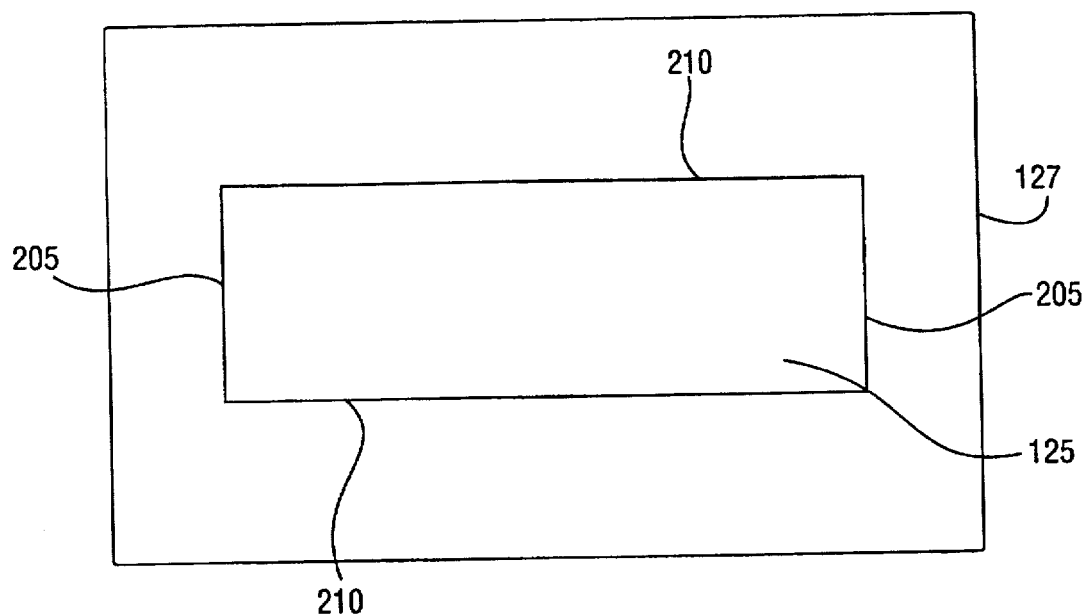
FIG. 2 is an illustration of a straight edge (i.e., horizontal) prior-art slit in a light blocking plate.

For a conventional straight-edged rectangular slit 125 as shown in FIG. 2, the image of the slit 150 on the focal plane will be tilted by an angle with respect to the direction of the skewed linear array 152 as shown in FIG. 6(b). The image of the rectangular entrance slit will not match with the resolution element and will extend beyond the ideal two pixels 151.

Figure 3:
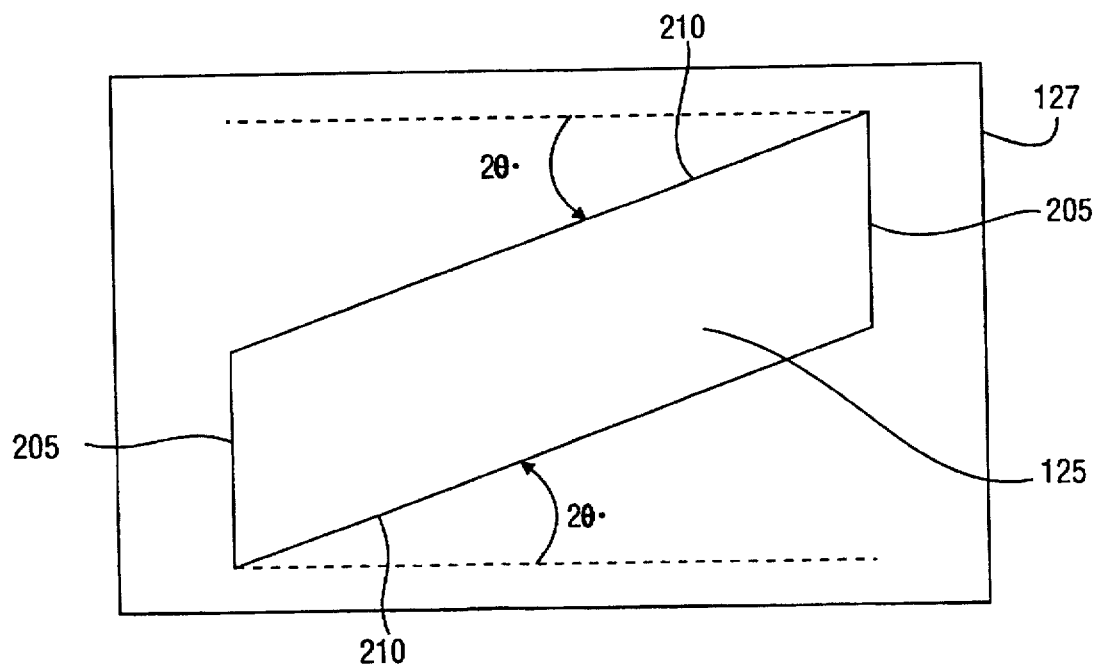
FIG. 3 is an illustration of a slit which has been translated and stretched as described in an illustrative embodiment of the invention.

FIG. 3 illustrates the geometric configuration of one embodiment of the slit in the present invention. The slit having a shape defined by translating a short side 205 of a rectangular slit in a direction parallel to said short side, while simultaneously stretching two long sides 210 of said rectangular slit, in an amount sufficient to rotate the said two long sides by an angle of 2θ. Computation of the amount of translation of the short sides and stretching of the long sides of the rectangular slit is a matter of basic trigonometry. The image 150 of the entrance slit of the invention on the focal plane of the echelle spectrometer will align squarely with the skewed linear array 162 as shown in FIG. 6(c). The image of the entrance slit match the shape and orientation of the resolution element of two pixels 161.

A principal advantage of the echelle spectrometer described above is that it achieves higher detector resolution at comparatively low cost, without complicated signal processing of raw information from the detector array. It also facilitates achieving extended spectrum coverage by orienting the detector array to match the dispersion pattern of the echelle grating, e.g., rather than a horizontal orientation, the detector array may be oriented along skewed lines or a diagonal line extending between two opposite corners of the detector surface. See FIGS. 5(a) and 5(b).

The illustrative embodiments described above are particularly useful for an echelle spectrometer since by its nature it is a two dimensional detection system. However, the invention could also be applied to any spectrometer where the image of the slit should align and match the detector array.

It will be appreciated by those of ordinary skill having the benefit of this disclosure that the illustrative embodiment described above is capable of numerous variations without departing from the scope and spirit of the invention. Accordingly, the exclusive rights sought to be patented are as described in the claims below.

What is claimed is:

1. An echelle spectrometer comprising:
    (a) an echelle grating that has a face, a plurality of ruling lines, and a dispersion direction;
    (b) a detector array;
    (c) a slit shaped and oriented to align an image of a light beam projected through the slit, onto the echelle grating, and onto the detector array, to a desired shape and orientation relative to the detector array;
    (e) wherein the light beam falls on the echelle grating at an angle θ with respect to a plane perpendicular to the ruling lines of the grating, and an angle α with respect to a plane parallel to the rulings,
    (f) wherein the slit has a shape defined by translating a short side of a rectangular slit in a direction parallel to the other short side, while simultaneously stretching two long sides of said rectangular slit, in an amount sufficient to rotate the two long sides by an angle of arctan (2tanα tanθ).

2. An echelle spectrometer comprising:
    (a) an echelle grating that has a face and a plurality of ruling lines;
    (b) a detector array; and
    (c) a slit shaped and oriented to align an image of a light beam projected through the slit, onto the echelle grating, and onto the detector array, to a desired shape and orientation relative to the detector array,
    (d) an axis of the detector array is parallel to the rulings of the grating; and
    (e) the slit having a shape defined by translating at least one short side of an initially rectangular slit while simultaneously stretching at least one long side of said initially rectangular slit.

3. The echelle spectrometer of claim 2, wherein the at least one short side of the initially rectangular slit is translated in a direction parallel to said short side.

4. The echelle spectrometer of claim 2, wherein:
    (1) the light beam falls on the echelle grating at an angle θ with respect to a plane perpendicular to the ruling lines of the grating, and an angle α with respect to a plane parallel to the rulings, and;
    (2) the at least one short side of the initially rectangular slit is translated in an amount sufficient to rotate the at least one long side by an angle of arctan (2tanα tanθ).

5. The echelle spectrometer of claim 2, wherein the detector array is oriented so that a dispersion pattern of the echelle grating falls along a skewed line extending between two sides of the detector array.

6. The echelle spectrometer of claim 2, wherein a cross dispersion element is placed between the echelle grating and the detector array.

7. The echelle spectrometer of claim 2, wherein a reflector is used to reflect radiation onto the grating.

8. The echelle spectrometer of claim 2, wherein a reflector is used to reflect the dispersion pattern of the grating onto the detector array.

9. The echelle spectrometer of claim 2, wherein a mask is placed between the echelle grating and the detector array for screening unwanted radiation from the detector array.

10. A spectrometer comprising:
    (a) a grating that has a face and a plurality of ruling lines;
    (b) a detector array; and
    (c) a slit shaped and oriented to align an image of a light beam projected through the slit, onto the grating, and onto the detector array, to a desired shape and orientation relative to the detector array,
    (d) an axis of the detector array is parallel to the rulings of the grating; and
    (e) the slit having a shape defined by translating at least one short side of an initially rectangular slit while simultaneously stretching at least one long side of said initially rectangular slit.

11. A spectrometer of claim 10, wherein the lines on said grating are spaced so as to have about 100 lines/mm.

12. A spectrometer of claim 10, wherein the grating is an echelle grating.

13. The spectrometer of claim 10, wherein the detector array is oriented so that a dispersion pattern of the grating falls along a diagonal line extending between two opposite corners of the detector array.

14. The spectrometer of claim 10, wherein a cross dispersion element is placed between the grating and the detector array.

15. The spectrometer of claim 10, wherein a reflector is used to reflect radiation onto the grating.

16. The spectrometer of claim 10, wherein a reflector is used to reflect the dispersion pattern of the grating onto the detector array.

17. The spectrometer of claim 10, wherein a mask is placed between the grating and the detector array for screening unwanted radiation from the detector array.

* * * * *